(No Model.)

R. M. REILLY.
PIPE COUPLING.

No. 291,773. Patented Jan. 8, 1884.

WITNESSES:
Thos Houghton.
Wm Read

INVENTOR:
Robt. M. Reilly
BY Munn
ATTORNEYS.

UNITED STATES PATENT OFFICE.

ROBERT M. REILLY, OF BALTIMORE, MARYLAND.

PIPE-COUPLING.

SPECIFICATION forming part of Letters Patent No. 291,773, dated January 8, 1884.

Application filed May 5, 1883. (No model.)

*To all whom it may concern:*

Be it known that I, ROBERT M. REILLY, a citizen of the United States, residing at Baltimore, in the State of Maryland, have invented a new and useful Improvement in Pipe-Joints, of which the following is a specification.

Figure 1:
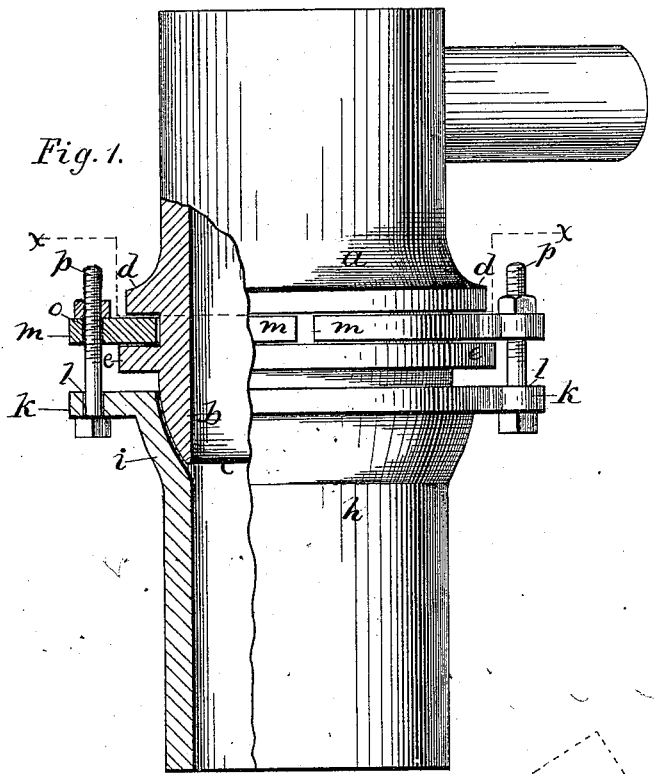
Figure 2:
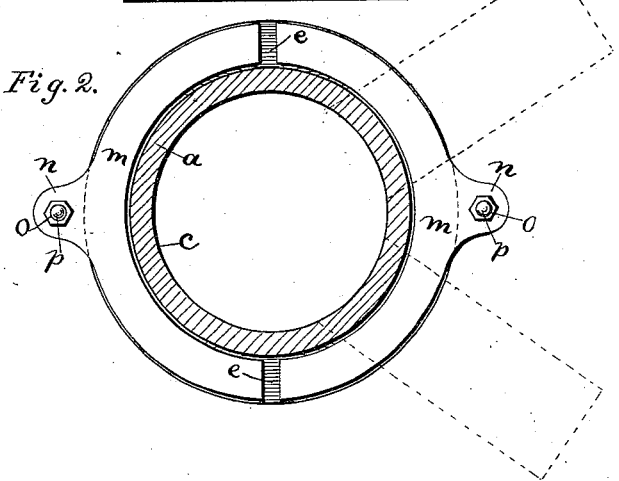

Figure 1 is a vertical elevation of my improved pipe-joint, partly in section; and Fig. 2 is a horizontal section on line $x\ x$ of Fig. 1.

My invention relates to improvements in pipe-joints; and it consists in the peculiar arrangement and construction of the parts, as hereinafter more fully described, and set forth in the claim.

In the accompanying drawings, $a$ represents the male portion of the pipe, provided at its lower end with a ball, $b$, having an orifice, $c$, at its bottom for the passage of a fluid.

$d$ and $e$ are two collars formed on the lower end of the pipe $a$, just above the ball $b$, with a slight space between them.

$h$ represents the female portion of the pipe, the upper interior end of which is rounded out at $i$ to receive the ball $b$, which fits therein. The upper end of the female portion of the pipe $h$ is provided with a flange, $k$, having openings $l$ for the passage of bolts.

$m$ represents horseshoe-pieces, each provided over the center of its arch with a lug, $n$, having a hole, $o$. The horseshoe-pieces $m$ are inserted in the space between the collars $d$ and $e$ on the male portion $a$ of the pipe, opposite each other, and are secured to the female portion $h$ of the pipe by means of bolts $p$, passing through the openings $l$ in the flange $k$, and thence through the holes $o$ in the lugs $n$ of the horseshoe-pieces $m$, whereby the male and female portions of the pipe are securely fastened together.

The advantage of forming the horseshoe connecting-pieces $m$ separate from the male portion $a$ of the pipe, instead of being rigidly secured thereto, is that the pipe and its connections have frequently to be turned to make a branch pipe connect with another pipe, and when the male pipe is thus turned, if the horseshoe-pieces were rigidly attached to the male pipe, the holes therein would not register with the openings $l$ in the flange $k$, which objection is entirely obviated by making the horseshoe-pieces $m$ separate from the male portion of the pipe.

Another advantage of having the horseshoe-pieces separate from the male portion of the pipe is that, when it is desired to give the male portion of the pipe a pitch or inclination, by tightening the nut on one side and loosening it on the other, it is easily done by means of the ball-and-socket connection between the pipes. If the horseshoe-pieces were rigidly secured to the male portion, the holes therein would not register with the holes in the flange $k$.

In some cases it may be found necessary to reverse the parts, placing the collars $d\ e$ on the female portion of the pipe, and the flange $k$, with its opening $l$, on the male portion of the pipe.

Having thus fully described my invention, what I claim as new, and desire to secure by Letters Patent, is—

The combination, with the male pipe $a$, provided with the ball $b$, having an orifice, $c$, in its bottom, and flanges $d\ e$, and female pipe $h$, rounded out internally at its upper end, and provided with the flange $k$, having opening $l$, of the horseshoe-pieces $m$, each provided with a lug, $n$, having a hole, $o$, and pins $p$, substantially as described, and for the purpose set forth.

ROBERT M. REILLY.

Witnesses:
W. MAZETYS,
JNO. T. MADDOX.